D. R. COLLIER.
CHILD'S SULKY.
APPLICATION FILED JUNE 16, 1915.
1,179,370.
Patented Apr. 11, 1916.
4 SHEETS—SHEET 1.
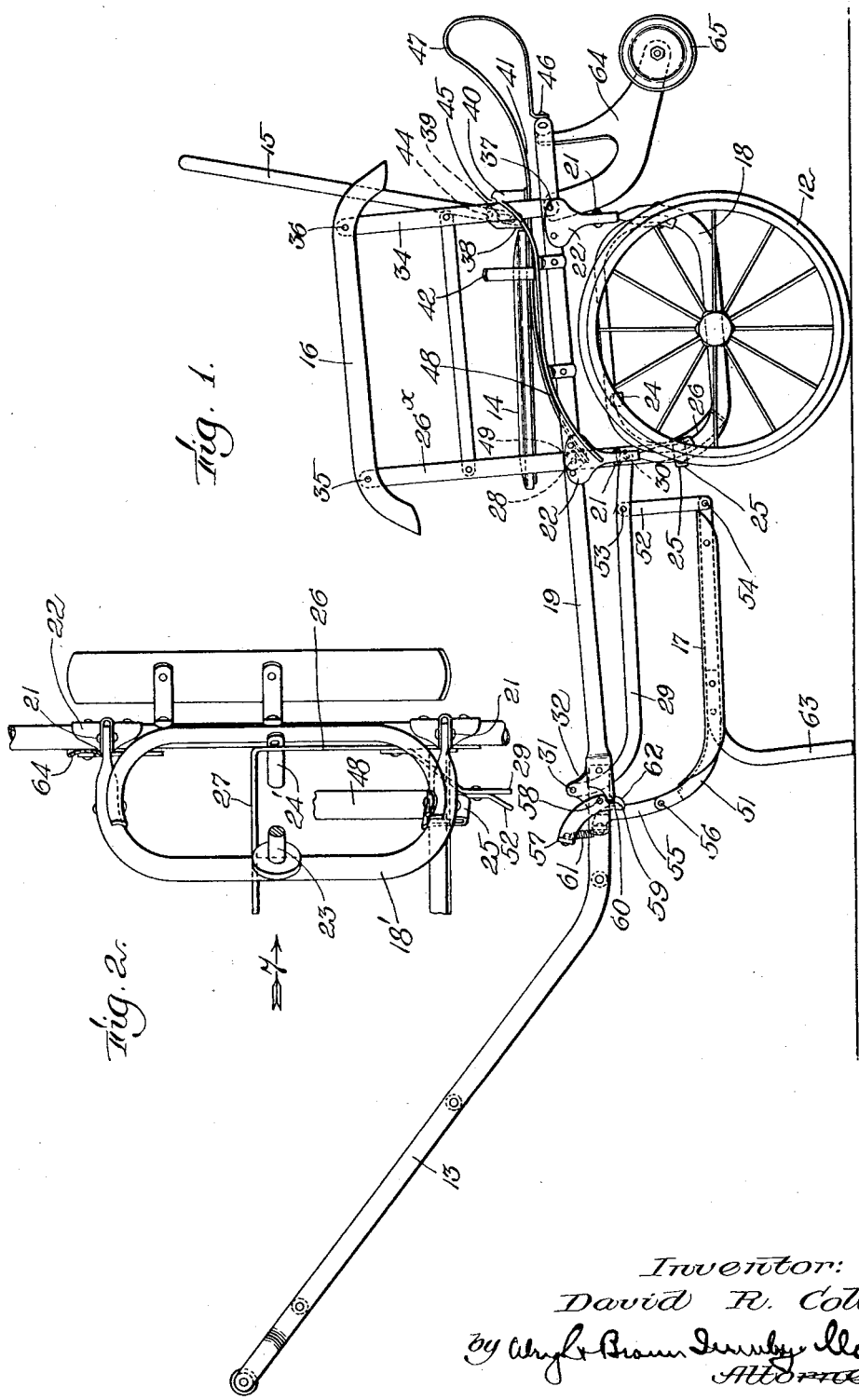
Inventor:
David R. Collier,
by Wright Brown Quinby May
Attorneys.

D. R. COLLIER.
CHILD'S SULKY.
APPLICATION FILED JUNE 16, 1915.
1,179,370.
Patented Apr. 11, 1916.
4 SHEETS—SHEET 2.
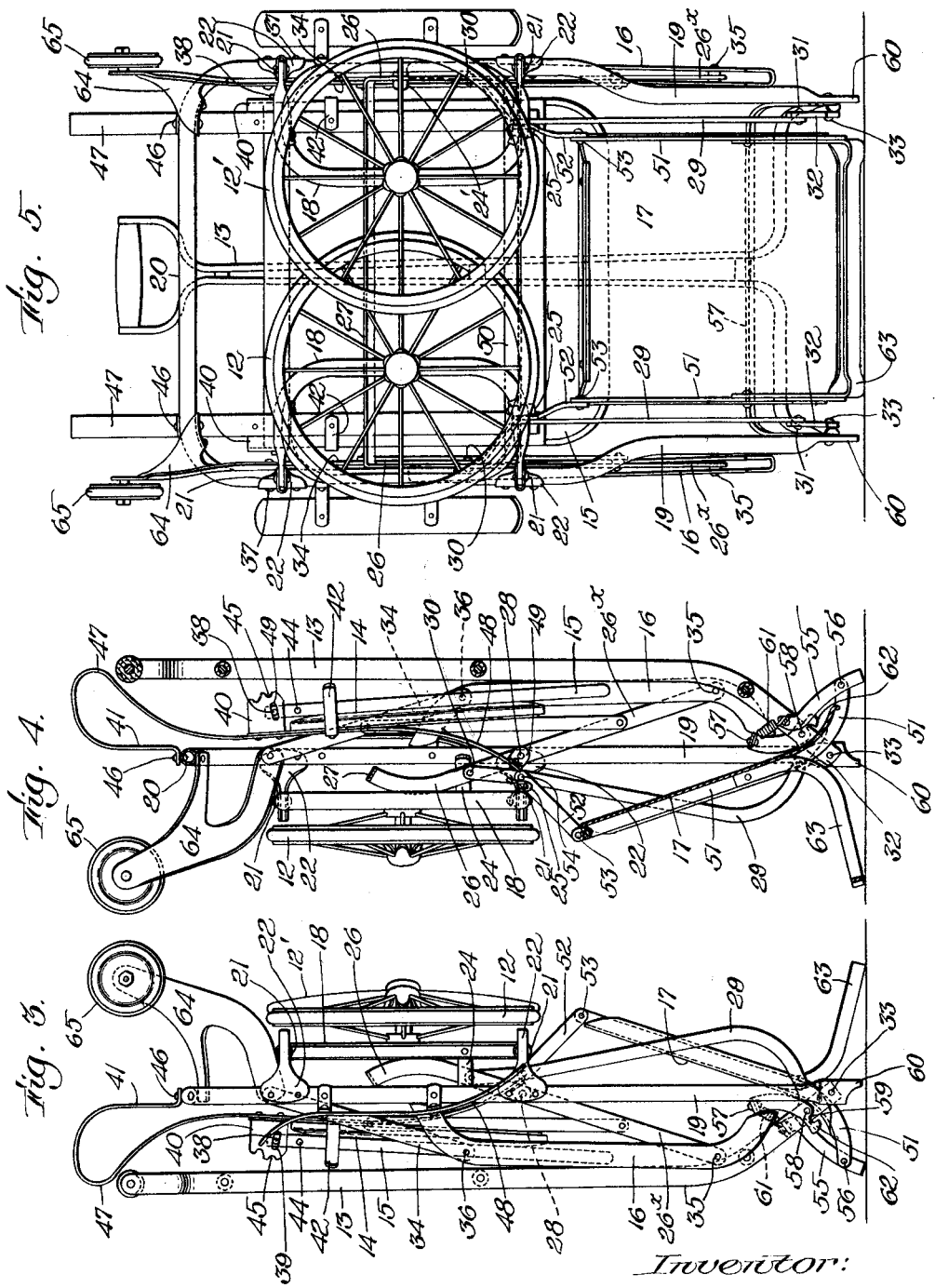
Inventor:
David R. Collier,
by [signature]
Attorneys.

D. R. COLLIER.
CHILD'S SULKY.
APPLICATION FILED JUNE 16, 1915.
1,179,370.
Patented Apr. 11, 1916.
4 SHEETS—SHEET 3.
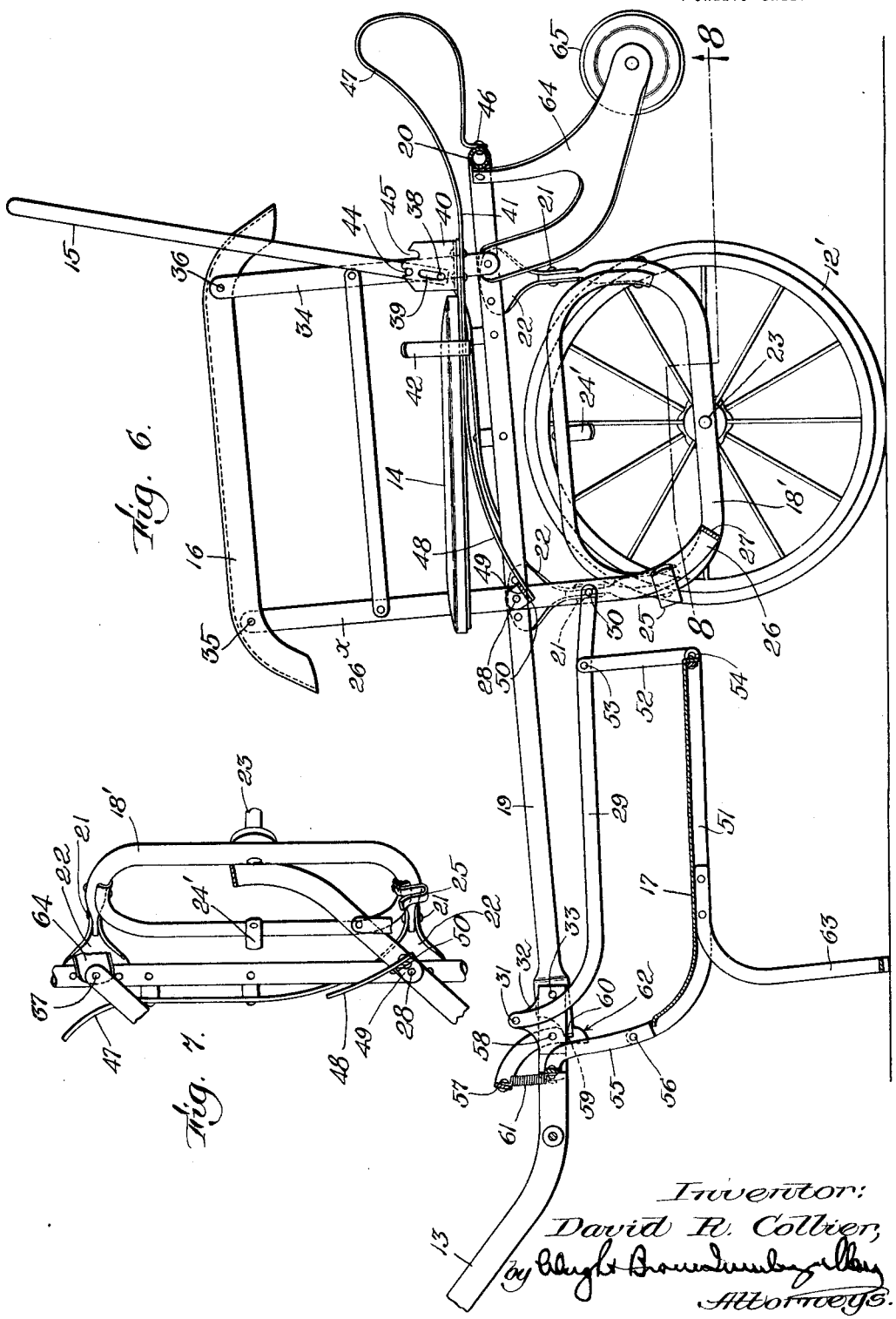
Inventor:
David R. Collier,
by [signature]
Attorneys.

D. R. COLLIER.
CHILD'S SULKY.
APPLICATION FILED JUNE 16, 1915.
1,179,370.
Patented Apr. 11, 1916.
4 SHEETS—SHEET 4.
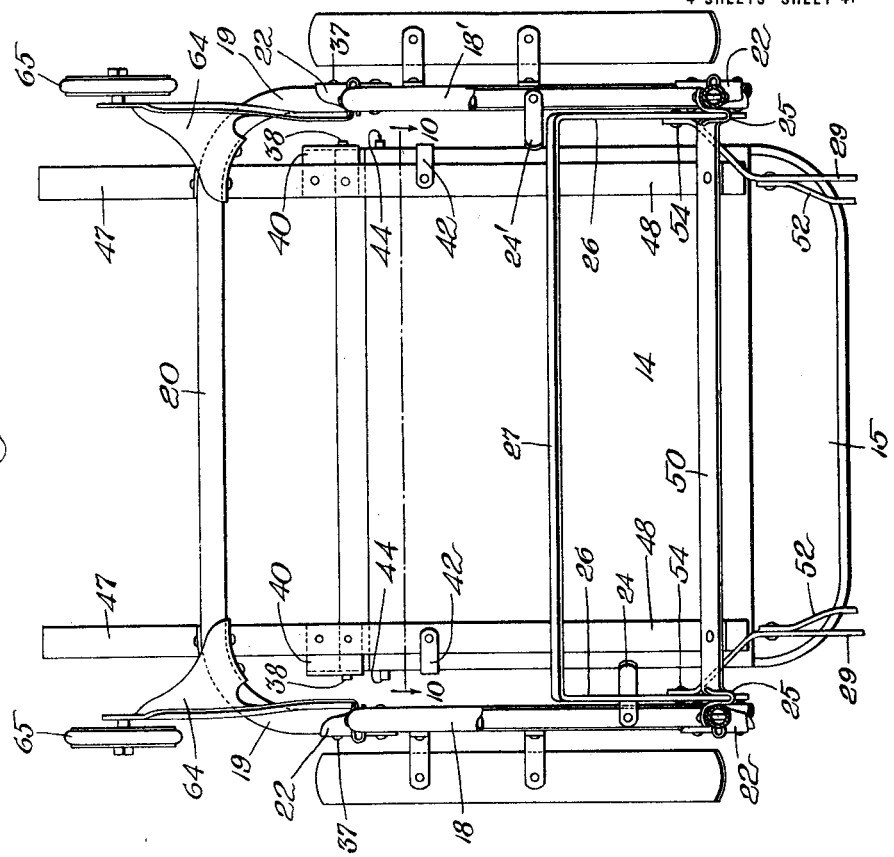
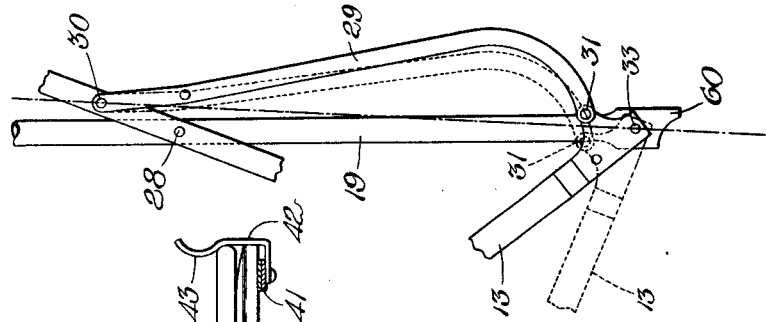
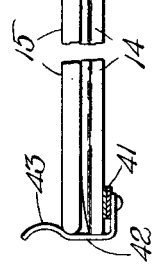
Inventor:
David R. Collier,

UNITED STATES PATENT OFFICE.

DAVID R. COLLIER, OF GARDNER, MASSACHUSETTS, ASSIGNOR TO COLLIER-KEYWORTH COMPANY, OF GARDNER, MASSACHUSETTS, A CORPORATION OF MASSACHUSETTS.

CHILD'S SULKY.

1,179,370.  Specification of Letters Patent.  Patented Apr. 11, 1916.

Application filed June 16, 1915. Serial No. 34,519.

*To all whom it may concern:*

Be it known that I, DAVID R. COLLIER, a citizen of the United States, and resident of Gardner, in the county of Worcester and State of Massachusetts, have invented certain new and useful Improvements in Children's Sulkies, of which the following is a specification.

The object of the present invention is to provide an improved collapsible child's sulky.

In the construction of a sulky embodying my present invention, the sulky comprises a folding running frame, a tongue or handle pivotally connected to said frame to fold thereon, a back-rest pivotally mounted to fold forwardly and downwardly upon the seat, and other features which need not be explained at the present time. The back-rest is mounted so as to fold independently, and the tongue or handle is arranged to fold over and upon the back-rest. There are suitable connections operable by the tongue or handle to transmit folding movement from the latter to the other folding elements excepting the back-rest, said connections being arranged to keep the tongue or handle in its folded position, to the end that it will not be accidentally displaced from its folded position when the sulky is standing or being carried while in folded condition. When the tongue or handle and the back-rest are both in folded position, the former is effective for keeping the back-rest in folded position. I have nevertheless provided the sulky with other means arranged to keep the back-rest in folded position without depending upon the tongue or handle for this purpose, but the said means may be omitted if desired, and the tongue or handle alone may be depended upon for keeping the back-rest in folded position.

There are other improved features embodied in the sulky which are illustrated by the drawings and hereinafter described and claimed.

On the drawings: Figure 1 represents a side elevation of a sulky embodying the present invention, the same being shown in open or operative condition. Fig. 2 represents, on a larger scale, a bottom plan view, partly in section, of one of the folding wheel frames together with portions of the structure adjacent thereto. Fig. 3 represents a side elevation of the sulky in folded condition, the sulky being represented as standing on its forward end. Fig. 4 represents a sectional view of the sulky in folded condition as viewed from the opposite side with reference to Fig. 3. Fig. 5 represents an elevation of the sulky in folded condition as viewed from right to left with reference to Fig. 3. Fig. 6 represents a longitudinal section, on a larger scale, of the sulky as shown by Fig. 1, the front portion of the tongue or handle being broken off. Fig. 7 represents a view of the structure shown by Fig. 2, the viewpoint being indicated by arrow 7 in Fig. 2. Fig. 8 represents a bottom plan view of the structure within the range of line 8—8 of Fig. 6, but in Fig. 8 the operating connections are shown in a different position as hereinafter described. Fig. 9 represents a diagrammatic view including a portion of the running frame, a portion of the folding tongue or handle, and elements of the operating connections whereby the operating crank of the tongue or handle is caused to cross a "dead center" to keep the tongue or handle in folded position. Fig. 10 represents a sectional view showing means other than the tongue or handle for keeping the back-rest in folded position. The viewpoint of this figure is indicated by line 10—10 of Fig. 8.

The same reference characters indicate the same parts wherever they occur.

The sulky comprises a running frame including wheels 12, 12', a tongue or handle 13, seat 14, a back-rest 15, arm-rests 16, a foot-board 17, and other elements which will be described in due course.

The running frame comprises three sections, two of which, 18 and 18', I term wheel frames because they are carried respectively by the wheels when the structure is open and resting upon the wheels. The third or main section of the running frame is made of a single continuous length of stock, preferably tubular stock, and is U-shaped in form (see Fig. 5) and comprises two side bars 19, 19 and a crossbar 20 connecting the rear ends of the side bars. The wheel frames 18, 18' are connected by pivots 21 to ears 22 affixed to the side bars 19, 19. There are four of said ears, two of them being affixed to one of the side bars and the other two being affixed to the other side bar. There are also two pivots 21 for each wheel frame, the pivots of one wheel frame being in line with each other and those of the other frame being likewise in line with each other, the axes of said pivots being parallel to the length of the sulky. In the course of folding the running frame, the wheel frames swing toward each other and they also swing toward the seat so as to reduce the depth of the structure, as may be observed by referring to Figs. 3 and 4. Each wheel frame includes a stub axle 23, the wheels being arranged on said axles. As shown by Fig. 1, wheel frame 18 has an ear or lug 24, and, as shown by Fig. 6, wheel frame 18' has an ear or lug 24'. These lugs are instrumental in causing folding movement of the wheel frames relatively to the main frame, as will be understood after further description, and they are arranged in different positions relatively to their respective wheel frames, as shown by Fig. 8, in order to cause the wheel frames to move successively instead of in unison to their respective folded positions. The purpose of such successive movement is to avoid interference of the wheels in the course of the folding movement.

The sulky is provided with means for locking the two wheel frames in operative position. For this purpose each wheel frame is provided with a locking clip 25, said clips being substantially U-shaped, as shown by Fig. 8. These clips are engaged respectively by locking levers 26. The said levers in the present instance are formed from a single continuous length of stock which is bent to a U-shape (see Fig. 8), the lower ends of said levers being connected by a transverse portion 27, and the upper ends extending above the running frame as indicated at 26ˣ to support the forward ends of the arm-rests. The members 26, 26ˣ are connected to the side bars 19 by fulcrum studs 28. Motion is transmitted from the tongue 13 to the levers 26, 26ˣ by links 29. The links are connected respectively to the members 26 by pivot studs 30, and the forward ends of the links are arranged upon crankpins 31. Said crankpins are carried by plates 32 affixed to the tongue. The tongue is connected to the side bars 19 by fulcrum studs 33. When the tongue is swung upwardly and to the rear, the crankpins 31 move the links 29 to the rear, such movement causing the locking levers to move out of the locking clips 25 to release the wheel frames. As the movement of the levers 26 continues, one of them (Fig. 8) engages the ear or lug 24, thereby imparting folding movement to the wheel frame 18. In due course the other lever 26 engages the lug 24' of the wheel frame 18', thereby imparting folding movement to the latter. The extensions 26ˣ in partaking of such movement carry the arm-rests 16 forwardly and downwardly. The arm-rests have motion similar to that of a parallel ruler, their rear ends being carried by links 34. The arm-rests are pivotally connected to the members 26ˣ by pivot pins 35 and are pivotally connected to the links 34 by pivot pins 36. The links 34 are pivotally connected to the bars 19 by pivot pins 37. In the course of folding the tongue 13 the crank pins 31 (Fig. 9) cross the "dead center" as between the axis of the fulcra 33 and the axis of the pivot members 30, the crossing occurring after the wheel frames have arrived at their extreme folded positions and when the tongue has nearly reached its extreme folded position. The normal effective length of the links 29 between the members 30 and 31 is slightly greater than the distance between the centers of said members when the members 31 are on the "dead center", in consequence of which the links 29 are sprung laterally. After the crankpins have crossed the "dead center" the links 29 react, or, in other words, spring back to their normal condition. In this way the links are made effective for keeping the tongue in its folded position, for in order to unfold the tongue it is necessary to spring the links 29 as the crankpins 31 cross the "dead center" in the opposite direction. The back-rest has a pair of pivot pins 38 at its lower end, said pins projecting laterally in opposite directions as shown by Fig. 8. These pins occupy slots 39 in plates 40. In the present instance said plates are carried by leaf springs 41, which also carry the seat 14. The back-rest is capable of swinging forwardly and downwardly from the position shown by Figs. 1 and 6, so that it may lie upon the seat. In practice, the back-rest will be folded before the other parts of the structure are folded, and will be ultimately kept in its folded position by the tongue 13 when the latter has been placed in its folded position. In such case the back-rest would be confined between the seat and the tongue, and the means hereinbefore described for keeping the tongue in folded position would serve indirectly to keep the back-rest in folded position. I have nevertheless provided additional means for keeping the back-rest in folded position so that it will not be dependent upon the tongue for this purpose. Spring clips 42 are fixed relatively to the seat and are arranged at opposite sides of the seat. Said clips have offset portions 43 (see Fig. 10) which normally stand in the path of the side edges of the back-rest. As the back-rest approaches its folded position, its side edges displace the offset portions 43, and the latter spring back behind the said side edges when the back-rest reaches its extreme folded position. The back-rest is provided with another pair of pins, indicated at 44. Each plate 40 is provided with notches 45 into which pins 44 may drop, the pivot pins 38 being capable of traversing the slots 39 to permit the pins 44 to enter and leave the notches. I have shown two notches 45 in each plate 40, thus providing means for keeping the back-rest in either of two operative positions.

The seat 14 is supported by a pair of leaf springs 41. The rear ends of these springs are anchored rigidly by suitable means such as rivets 46 to the rear crossbar 20 of the running frame. Each spring is formed with a loop 47 whereby its effective length is increased, so far as spring action is concerned. The forward portion of each spring curves downwardly as indicated at 48. The forward extremities of the springs are fastened rigidly by suitable means such as rivets 49 to a crossbar 50. The ends of said crossbar are bent to receive the fulcrum pins 28 hereinbefore described in connection with the levers 26, 26×. The crossbar 50 is capable of swinging about the axis of the studs 28 to afford the desired freedom of end thrust required by the leaf springs as the latter are flexed by the load upon the seat. The purpose and effect of the bar 50 is similar to that of a shackle with which leaf springs are commonly provided. In the present instance, however, both springs are served by the same bar. As the springs are depressed the bar will swing toward the front of the sulky, and as the springs react the bar will swing toward the rear. In consequence of mounting the plates 40 upon the leaf springs 41, the back-rest is rendered capable of yielding when it is in either one of its operative positions. The spring action, when the occupant leans against the back-rest, involves a change of angle of the substantially straight portions which connect the loops 47 with the curved portions 48 of the springs. The rear corners of the seat are fastened to the said straight portions of the springs, and the forward portion of the seat projects tangentially from the curved portions 48. As the seat is depressed the curvature of the portions 48 diminishes, the tangential points of contact being thereby moved forward according to the amount of deflection of the springs. Thus, as the load increases, the tangential points approach the points of anchorage at the bar 50, and the springs are automatically conditioned to have more or less resilience according to whether the load is light or heavy.

The foot-board 17 is mounted upon a frame 51, and the rear end of said frame is supported by pivoted links 52 which are suspended from the links 29. Each link 52 is connected by a pivot member 53 with one of the links 29, and connected with the frame 51 by a pivot member 54. The forward end of the frame 51 is supported by a pair of arms 55, the connection being formed by pivot pins 56. The arms 55 are rigidly fastened to the tongue 13, and the foot-board is therefore caused to swing forwardly and upwardly as the tongue swings from operative position to folded position. The tongue is provided with a locking device which consists of a crossbar 57. This bar is carried by pivot pins 58, said pins being in turn carried by the tongue 13. The end portions of the bar 57 are formed with notches 59 and the forward ends of the side bars 19 are formed to provide locking projections 60, said projections being adapted to occupy the notches 59. A spring 61 anchored to the tongue 13 and connected to the bar 57 keeps the latter normally in locking position. The edges 62 of the locking bar are beveled in such manner as to ride over the projections 60 when the tongue is being moved from folded position to operative position, the locking bar being thereby displaced from its locking position sufficiently to enable the projections 60 to enter the notches 59. The frame 51 carries a prop or rest 63 arranged to support the forward end of the sulky when the tongue is not used for that purpose. This rest is so arranged as to coöperate with the arms 55, when the sulky is folded, to form a base by which the sulky may stand in an upright position, as shown by Figs. 3, 4 and 5. When the sulky is standing in this position the crossbar 20, which is then at the upper end of the running frame, is adapted to serve as a handle by which the sulky may be carried.

Brackets 64 are affixed to the side bars 19 and to the crossbar 20, and are provided with trailer wheels 65 by which the passage of the sulky up or down over curbstones may be facilitated. The trailer wheels and the loops 47 of the seat-supporting springs are so related to each other as to serve as a base to stand the sulky in an upright position if it should be desired to stand it in inverted position with reference to that shown by Figs. 3, 4 and 5.

The unfolding movement of the wheel frames 18, 18′ is caused by direct engagement therewith of the crossbar 27 and levers 26. As shown by Fig. 5 the crossbar 27 is behind the wheel frames. During the first portion of the unfolding movement the crossbar engages the wheel frame which is nearer the seat, and forces that wheel frame toward its operative position, said wheel frame acting on the other wheel frame through the medium of the two wheels which are lapped. As the unfolding movement progresses, the levers 26 are brought into contact with the wheel frames and act directly upon them to complete the unfolding movement, the locking clips 25 being thereby brought into register with the levers 26 so that the latter ultimately become seated in said clips to lock the structure in operative position.

I claim:

1. A sulky comprising a folding running frame including a main section and folding sections pivotally connected to said main section to fold thereon, a tongue, pivotal means connecting said tongue and said main section to enable said tongue to fold upon said main section, a crank carried by said tongue, and means arranged to transmit motion from said crank to said folding sections, said crank being arranged to cross a "dead center" and to spring said means in so doing, whereby said means is made effective for holding said tongue in folded position.

2. A sulky comprising a running frame, a tongue, pivotal means connecting said tongue and frame to enable said tongue to fold upon said frame, and means arranged to be sprung by said tongue when the latter is near its extreme folded position, said means being effective for holding said tongue in folded position.

3. A sulky comprising a folding running frame having wheels arranged to partake of the folding movement, and a prop arranged in front of said wheels to support the forward end of the sulky when said wheels are in running position on a subjacent support, said prop and the forward end of said running frame being arranged to cooperate to stand the sulky on its forward end when the running frame is folded.

4. A sulky comprising a frame structure, a pair of leaf springs, a crossbar pivotally connected to said frame structure at opposite sides of the latter, one end of each of said leaf springs being affixed to said frame structure and the other end being affixed to said crossbar, and a seat arranged upon said leaf springs.

5. A sulky comprising a folding frame including a plurality of sections and pivotal means connecting them, a tongue pivotally connected to one of said sections so as to be capable of folding upon said frame, and means arranged to transmit folding movement from said tongue to fold said frame, the latter said means including a resilient element arranged to be sprung by the folding operation, to keep said tongue in folded position.

6. A sulky comprising a running frame, a pair of leaf springs the ends of which are connected to said frame so that one end of each is capable of moving toward and from the other end as the spring is flexed, each spring having a substantially straight and approximately horizontal portion, and a resilient downwardly extending curved portion adjoining the first said portion, and a seat arranged upon and fastened to the first said portion of each spring and overhanging the said curved portion, whereby the tangential points of said seat and springs are automatically moved to shorten the effective spring length as the seat is depressed.

In testimony whereof I have affixed my signature.

DAVID R. COLLIER.

Copies of this patent may be obtained for five cents each, by addressing the "Commissioner of Patents, Washington, D. C."